(12) United States Patent
Davis, III

(10) Patent No.: US 8,376,674 B1
(45) Date of Patent: Feb. 19, 2013

(54) CARGO STRAP ASSEMBLY

(76) Inventor: John R. Davis, III, McCordsville, IN (US)

( * ) Notice: Subject to any disclaimer, the term of this patent is extended or adjusted under 35 U.S.C. 154(b) by 189 days.

(21) Appl. No.: 12/826,051

(22) Filed: Jun. 29, 2010

(51) Int. Cl.
*B60P 7/08* (2006.01)

(52) U.S. Cl. ........ 410/103; 410/100; 410/106; 410/110; 410/112

(58) Field of Classification Search ........... 410/12, 410/100, 101, 103, 106, 110, 116, 96, 97, 410/109, 112; 254/222, 364; 296/43; 248/499
See application file for complete search history.

(56) References Cited

U.S. PATENT DOCUMENTS

| | | | |
|---|---|---|---|
| 3,259,353 A | 7/1966 | Webb | |
| 3,421,726 A | 1/1969 | Getter | |
| 4,812,093 A | 3/1989 | Millar, Jr. | 410/110 |
| 5,141,277 A | 8/1992 | Alexander | 296/43 |
| 5,494,388 A | 2/1996 | Stevens | 410/112 |
| 5,887,840 A | 3/1999 | Hoffman | 248/503 |
| 5,915,900 A | 6/1999 | Boltz | 410/110 |
| 6,059,499 A | 5/2000 | Bird | 410/103 |
| 6,113,327 A | 9/2000 | Schrader | 410/97 |
| 6,290,441 B1 | 9/2001 | Rusu | 410/106 |
| 6,416,265 B1 | 7/2002 | Flores et al. | 410/106 |
| 6,464,437 B1 * | 10/2002 | Elwell | 410/107 |
| 6,742,972 B2 | 6/2004 | Brunet | 410/103 |
| 7,374,379 B2 | 5/2008 | Booher | 410/103 |
| 7,419,075 B2 | 9/2008 | Green | 224/405 |
| 7,431,548 B2 | 10/2008 | Acton et al. | 410/103 |
| 7,909,553 B2 * | 3/2011 | Snyder | 410/100 |

OTHER PUBLICATIONS www.cargogear.com, Bull Rings Retractable Truck Stake Pocket Anchors, Mar. 21, 2010, 2 pgs.
www.sfxperformance.com, Chrome Plated-fits all full-size pickup trucks-No Drill, Stake Pocket Mount Push-Up Tie Downs, Feb. 16, 2010, 1 pg.
www.uscargocontrol.com, Truck Tie Downs-Web Winches: Ratchet Straps, Tie Down Straps, E Track Tie Downs, Mar. 21, 2010, 2 pgs.
www.uscargocontrol.com, Ratchet Straps, Tie Down Straps, E Track Tie Downs, Moving Blanket, Mar. 21, 2010, 2 pgs.
www.uscargocontrol.com, Ratchet Straps, Tie Down Straps, E Track Tie Downs, Mar. 21, 2010, 3 pgs.

* cited by examiner

*Primary Examiner* — Stephen Gordon
(74) *Attorney, Agent, or Firm* — Woodard Emhardt Moriarty McNett & Henry LLP

(57) ABSTRACT

A cargo strap assembly constructed and arranged for receipt by a stake pocket of a vehicle wherein the vehicle includes a sidewall which further defines an opening in communication with the stake pocket. The cargo strap assembly includes a cargo strap module which is constructed and arranged to fit within the stake pocket, the cargo strap module including a retractable cargo strap having an extendable end which is constructed and arranged to extend through the sidewall opening of the vehicle. The cargo strap assembly is completed by the addition of a cover plate which is constructed and arranged to be positioned against the sidewall of the vehicle and attach directly to the cargo strap module for securing the cargo strap module within the stake pocket.

20 Claims, 16 Drawing Sheets

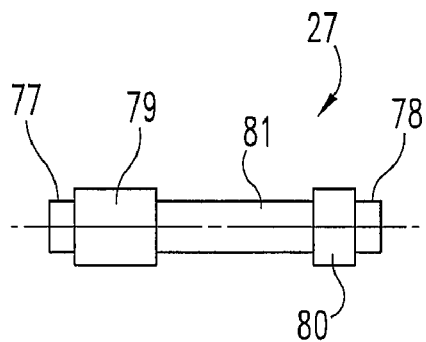 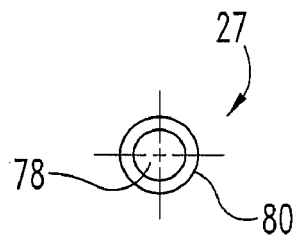
*Fig. 15A*  *Fig. 15B*
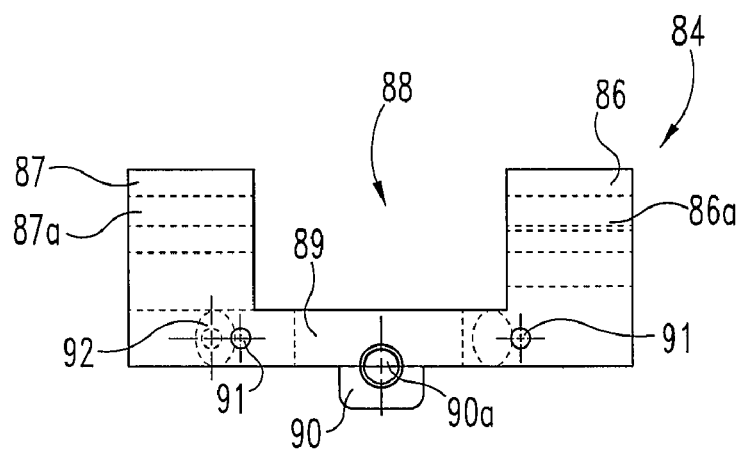
*Fig. 16A*

CARGO STRAP ASSEMBLY

BACKGROUND OF THE INVENTION

Numerous styles of cargo straps, for use with or in vehicles, are currently offered as a way to lash together, anchor, secure, and tie down objects, typically called or generically identified as "cargo". Many cargo strap styles use a first anchor location for one end of the strap with the other end (i.e., the free end) being adjustable and/or movable to (generally) secure the object or objects. The free end may be fitted with a clip or hook or simply formed with a loop. This free end may be secured by attaching it to an object, by attaching it to itself, or by attaching it to a second anchor location as some typical examples of the attaching or anchoring options. This second anchor location could be the same as the first anchor location. Some styles of cargo straps are constructed and arranged to simply encircle the cargo with one end of the strap connected to or through the opposite end of the strap.

The first anchor location may be part of a housing or a part of the vehicle with a spring-return structure or with a recoil or retractable mechanism. These arrangements are constructed and arranged to provide tightening for the cargo strap as well as provide a storage location for the length of cargo strap. When additional strap tightening is desired, a ratchet arrangement may be provided, either as a separate component which receives the cargo strap or by integration into another strap-handling mechanism. For example, this ratchet device or arrangement may be a part of a spring-return structure (recoil, retractable, etc.). When configured as a separate component with the cargo strap threaded therethrough, one end of the cargo strap may be secured to the ratchet base.

Considering the widespread use of cargo straps of the type described, vehicle manufacturers, typically manufacturers of pick-up trucks and similar vehicles, have been integrating anchor locations and structural anchoring components into the vehicle as a way to facilitate the use of cargo straps. These structural anchoring components which may also provide the anchor locations may be positioned in the vehicle bed, in the vehicle bed sidewalls, in the tailgate, or in the rearward surface of the cab as some of the more likely options in terms of possible locations.

With anchor locations of the type described, the cargo straps are typically separate structures and are added or removed (i.e., connected or attached) as required and must be separately housed or stowed, presumably in the vehicle so as to be readily available when a cargo securement need arises. One option is to roll up the cargo strap and try to find storage space in the vehicle. Another option is to leave one end of the cargo strap connected to an anchor point and the balance of the cargo strap loose in the bed of the vehicle.

One concern with the first option is the availability of storage space and the added steps of connecting and disconnecting the cargo straps. These steps can be made more complicated if the cargo to be secured covers up or interferes with the anchor locations which might be preferred or necessary for use in securing the cargo. If a cargo strap is left secured to an anchor location, the nature of the cargo might block that anchor location.

One concern with the second option which is described above is the safeguarding of the cargo straps from debris and potential theft. If the cargo straps are visible and easily removed or simply unhooked from the anchor location, then theft is more likely. These issues might cause the vehicle operator to opt for the first option, even if cab storage space is limited.

The cargo strap assembly which is disclosed herein offers an improvement to the current state of the art. The selected embodiment which is disclosed addresses the two concerns mentioned above. The retractable cargo strap which is positioned within a cargo strap module, as disclosed herein, is constructed and arranged to be received by a pick-up truck (or similar vehicle) stake pocket and is fastened into position such that it is not readily removable except by the intended owner or user. A couple of manipulations are likely required in order to remove the cargo strap assembly from within the truck bed of the vehicle. While theft is not necessarily prevented, theft of the cargo strap assembly is made more time consuming and thus more difficult. These aspects can deter theft to some degree. Further, when a threaded fastener is used for securement of the device within the vehicle stake pocket, the use of an "unusual" fastener head also helps to prevent theft when only conventional screwdrivers are likely available to the would-be thief. Further, the cargo strap is stowed in an existing space within the vehicle which is not otherwise being used and the limited cab space is left open for other articles. Additionally, the cargo strap retracts so as to have limited visibility and then only the tip of the free end is exposed as it extends outwardly from the inner surface of the vehicle sidewall.

The cargo strap module disclosed herein is arranged such that a length of cargo strap is stored on a reel-like dispenser and a portion of that length is extended in a first direction. A guide mechanism is used to turn the cargo strap into a second direction of travel so that it can be extended through the vehicle sidewall which defines the stake pocket.

The disclosed cargo strap assembly is considered to be novel and unobvious over the prior art.

BRIEF SUMMARY

A cargo strap assembly constructed and arranged for receipt by a stake pocket of a vehicle wherein the vehicle includes a sidewall which further defines an opening in communication with the stake pocket. The cargo strap assembly includes a cargo strap module which is constructed and arranged to fit within the stake pocket, the cargo strap module including a retractable cargo strap having an extendable end which is constructed and arranged to extend through the sidewall opening of the vehicle. The cargo strap assembly is completed by the addition of a cover plate which is constructed and arranged to be positioned against the sidewall of the vehicle and attach directly to the cargo strap module for securing the cargo strap module within the stake pocket.

One object of the present disclosure is to describe an improved cargo strap assembly.

BRIEF DESCRIPTION OF THE SEVERAL VIEWS OF THE DRAWINGS

FIG. 15A is a side elevational view of a guide roller which comprises one portion of the FIG. 6 cargo strap module.

FIG. 15B is an end elevational view of the FIG. 15A guide roller.

FIG. 16A is a front elevational view of a guide block which comprises one portion of the FIG. 6 cargo strap module.

DETAILED DESCRIPTION

Figure 1:
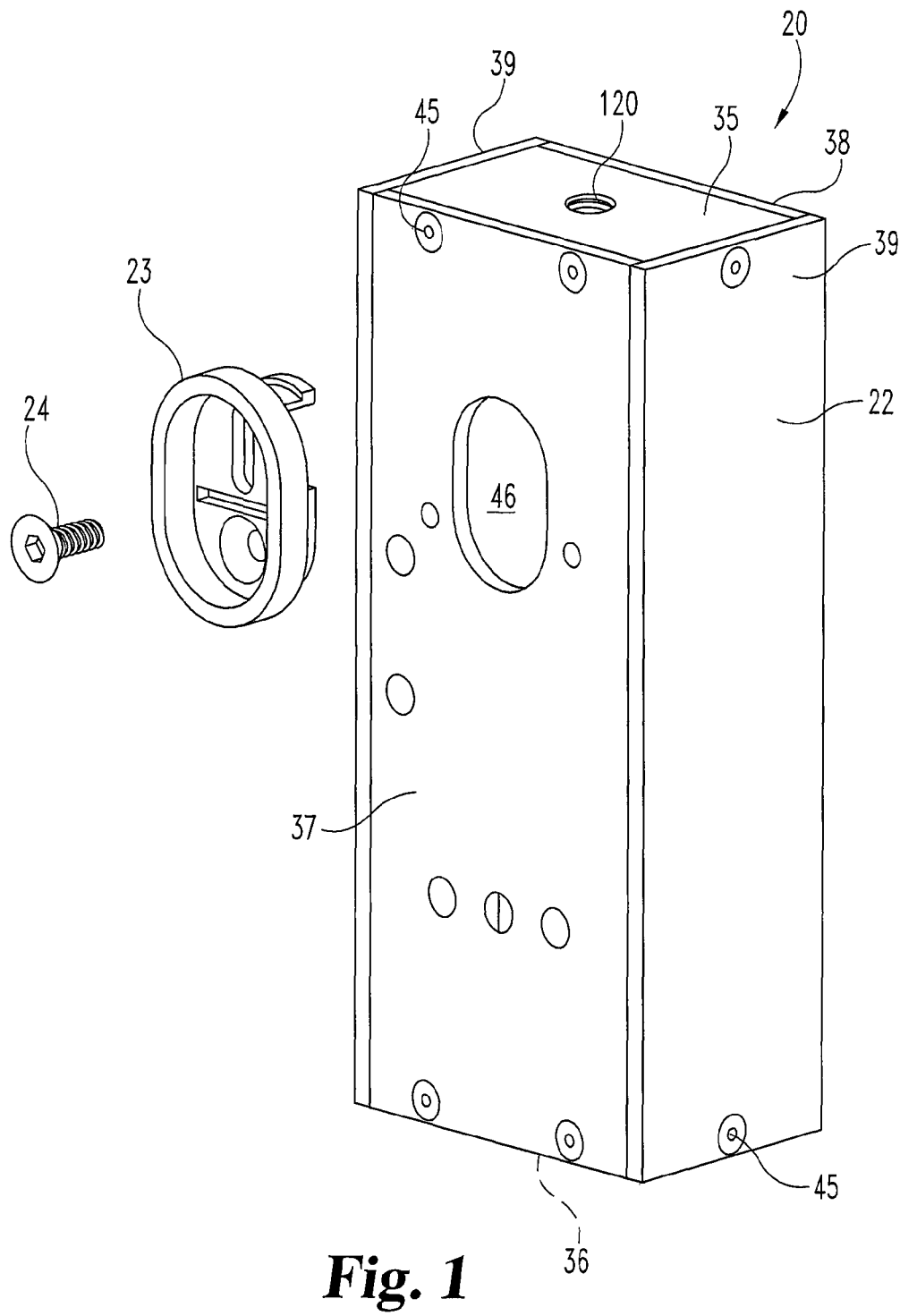
FIG. 1 is an exploded, perspective view of a cargo strap assembly according to the selected embodiment.

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

Figure 2:
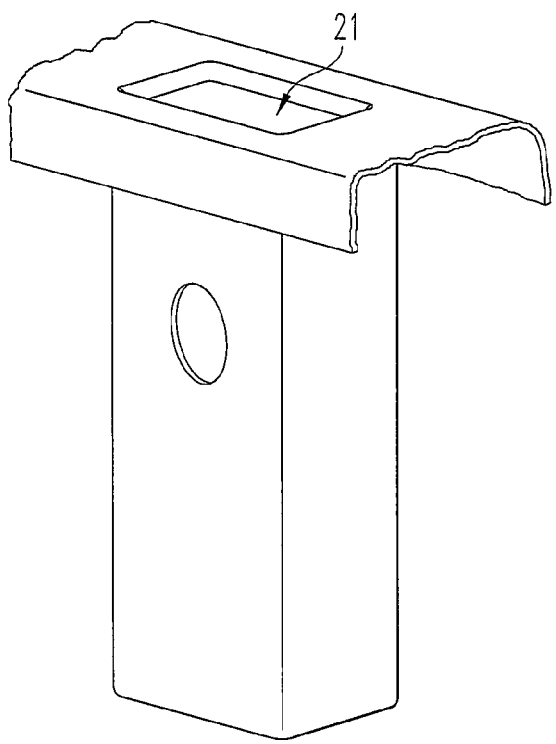
FIG. 2 is a partial, perspective view of a vehicle stake pocket which receives a cargo strap module portion of the FIG. 1 cargo strap assembly.
Figure 3:
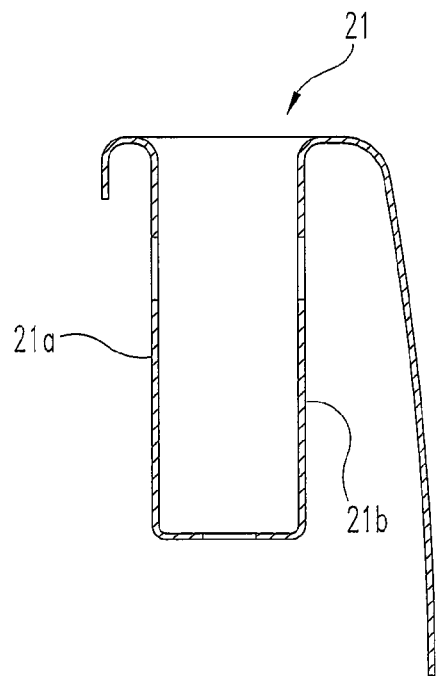
FIG. 3 is a partial, side elevational view, in full section, of the FIG. 2 vehicle stake pocket.
Figure 4:
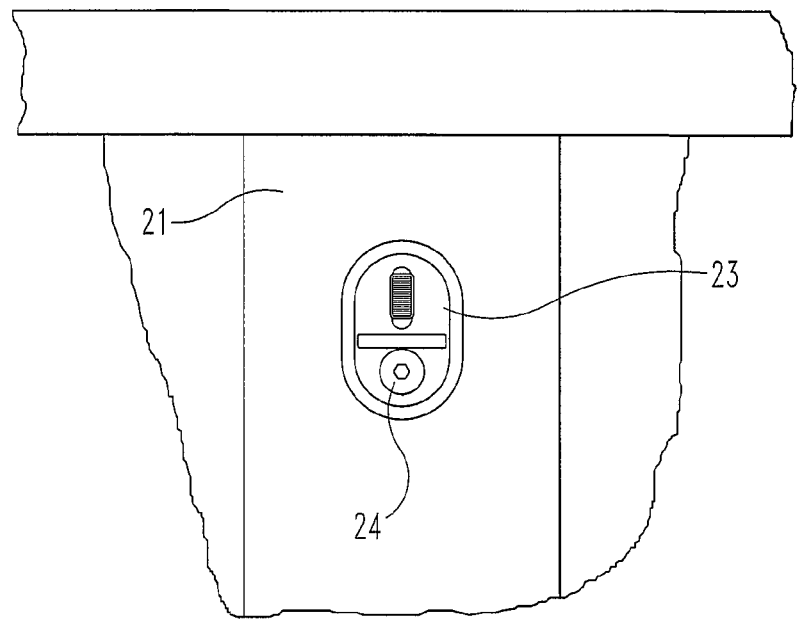
FIG. 4 is a front elevational view of the FIG. 1 cargo strap assembly as installed into the FIG. 2 vehicle stake pocket.
Figure 5:
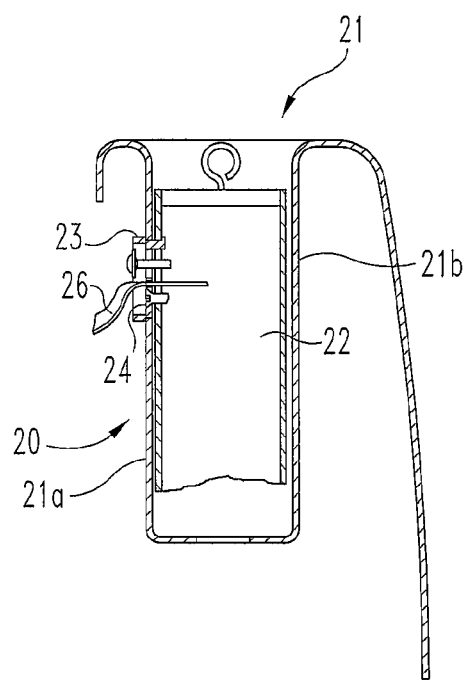
FIG. 5 is a side elevational view, in full section, of the FIG. 4 assembly.

Referring to FIG. 1 there is illustrated (as an exploded view) a cargo strap assembly 20 which is constructed and arranged to be installed into a vehicle stake pocket 21 (see FIGS. 2 and 3). For illustrative purposes, the vehicle stake pocket 21 is of the size, shape, and style which is typically found in various models of currently-manufactured pick-up trucks. Vehicle stake pocket 21 is defined in part by an interior-facing wall 21a and an exterior-facing wall 21b. Reference herein to the vehicle side wall refers to wall 21a. Cargo strap assembly 20 includes cargo strap module 22, cover 23, and threaded fastener 24. The installation of cargo strap assembly 20 into vehicle stake pocket 21 is illustrated in FIGS. 4 and 5. The specific details of the installation and the threaded fastener securement will be described later herein.

Figure 6:
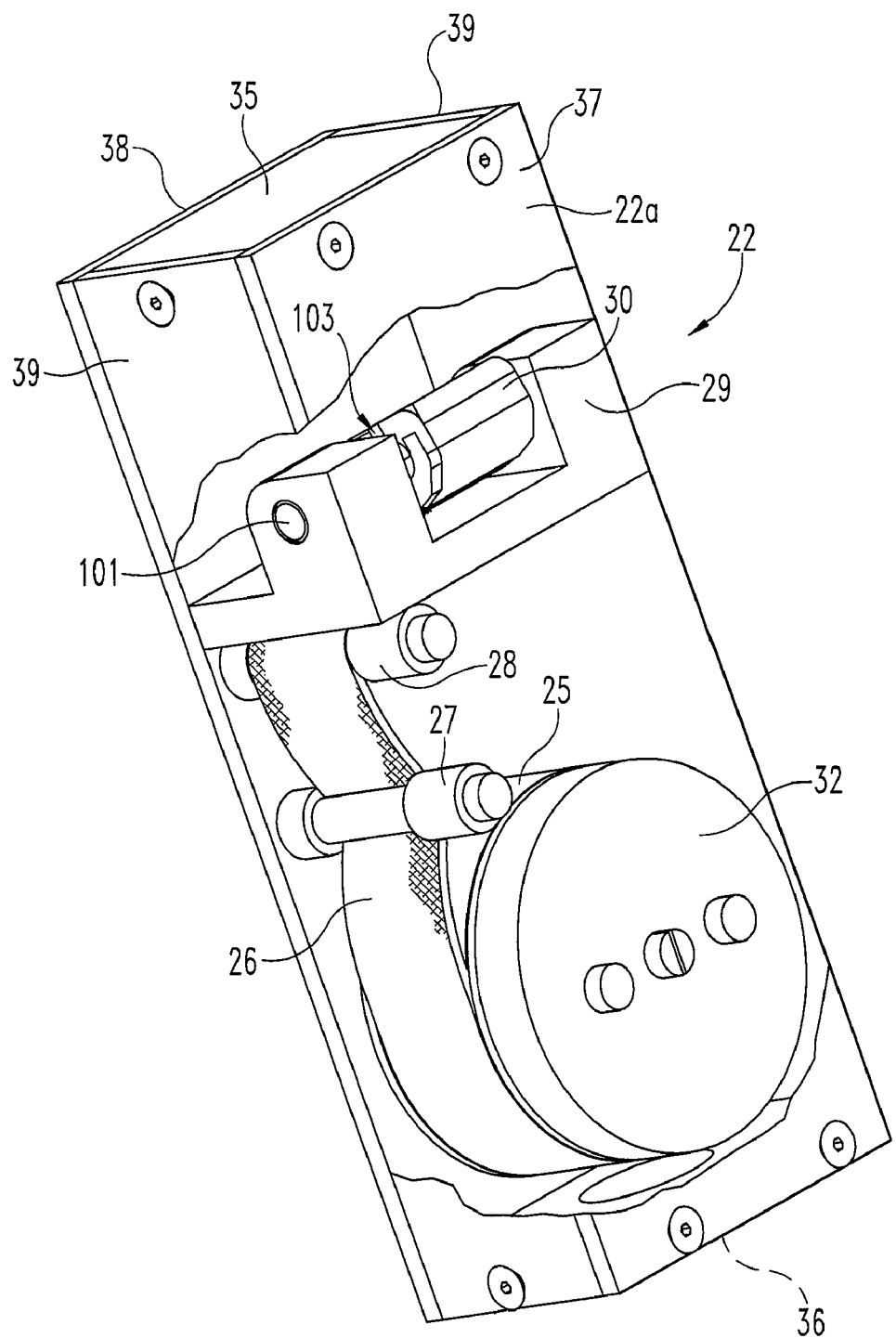
FIG. 6 is a fragmentary, perspective view of the cargo strap module which comprises one part of the FIG. 1 cargo strap assembly.
Figure 7:
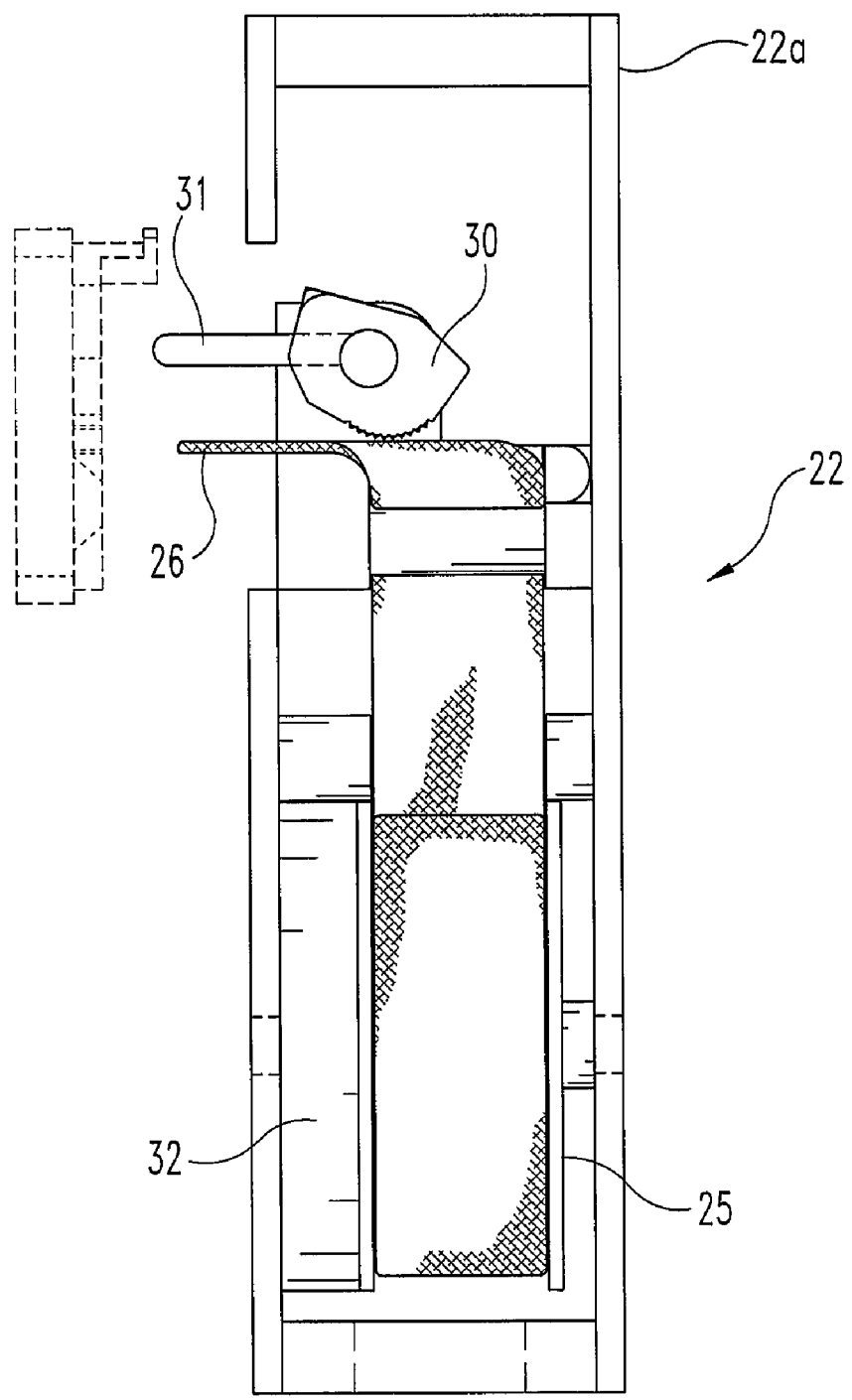
FIG. 7 is a diagrammatic, side elevational view of the FIG. 6 cargo strap module showing its relationship to a cover which comprises one portion of the FIG. 1 cargo strap assembly.

Referring further to FIGS. 6 and 7, the assembly details and component parts of cargo strap module 22 are illustrated. Cargo strap module 22 includes housing 22a, cargo strap reel 25, cargo strap 26, guide rollers 27 and 28, guide member 29, clamp member 30 (with lever 31), and spring module 32. Since the focus of FIGS. 6 and 7 is directed to cargo strap module 22, the cover 23 is shown only in broken line form and only in FIG. 7 for location reference and since its construction provides openings for the exit of the extended portion of the length of cargo strap 26 and for the clamp control lever 31.

Referring to FIGS. 8A-17C, the principle component parts which comprise cargo strap module 22 are illustrated. The referenced housing 22a includes a top plate 35, a bottom plate 36, a front wall 37, a rear wall 38, and two sidewalls 39. These six panels are screwed together to create a rectangular box-like structure. Although the material options are open for these six panels, there are some strength and durability requirements in view of the intended use.

In terms of orientations and labels, the "front" of cargo strap assembly 20 and of cargo strap module 22 is considered to be the view facing front wall 37 from the inside of the truck bed. It is front wall 37 which defines the exit opening (slot) for the cargo strap 26 as it would be pulled out or dispensed from within the cargo strap module 22 for use in securing cargo which is placed in the bed of the corresponding vehicle. When the cargo strap assembly 20 is installed in the stake pocket 21 of the selected vehicle, the "front" of cargo strap assembly 20 and of cargo strap module 22 is turned so as to face inwardly into the bed of the vehicle. In terms of vehicle orientation, the left sidewall 39 faces forward in the drive direction of the vehicle.

The "top" label refers to the upwardly facing direction, away from the road surface on which the vehicle is or will be traveling. The "bottom" label refers to the downwardly facing direction toward the road surface. These labels, directions, and orientations are based on a generally horizontal road surface with the vehicle being upright on that road surface.

Figure 8A:
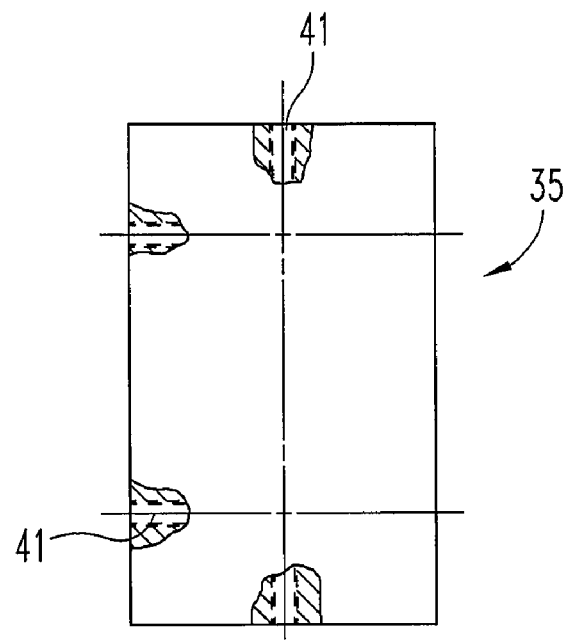
FIG. 8A is a top plan view of a top plate which comprises one portion of the FIG. 6 cargo strap module.
Figure 8B:
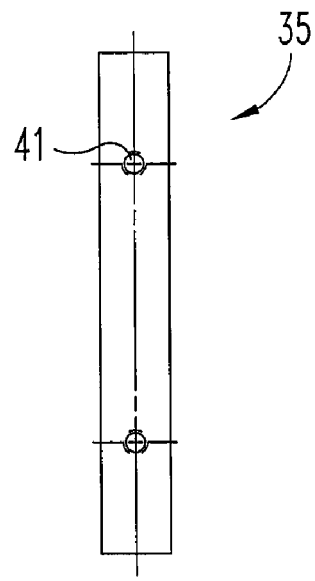
FIG. 8B is a front elevational view of the FIG. 8A top plate.

As illustrated in FIGS. 8A and 8B, the top plate 35 includes six (6) internally-threaded holes 41 for the receipt of threaded fasteners. These holes 41 are generally centered in the plate thickness with two (2) holes 41 in each of the front and rear faces and one (1) hole in each side.

Figure 9A:
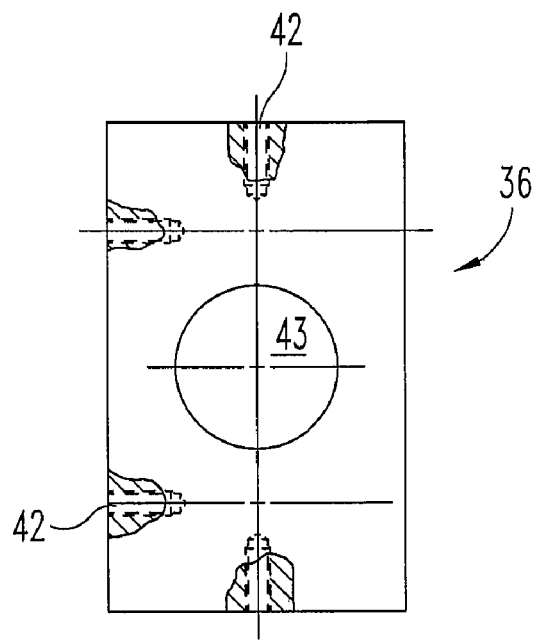
FIG. 9A is a top plan view of a bottom plate which comprises one portion of the FIG. 6 cargo strap module.
Figure 9B:
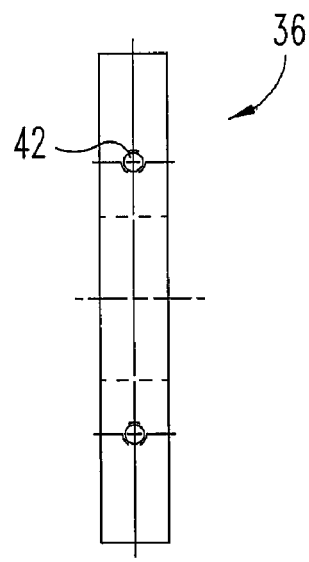
FIG. 9B is a front elevational view of the FIG. 9A bottom plate.

As illustrated in FIGS. 9A and 9B, the bottom plate 36 includes six (6) internally-threaded holes 42 for the receipt of threaded fasteners. These holes 42 are generally centered in the plate thickness with two (2) holes 42 in each of the front and rear faces and one (1) hole in each side. The bottom plate 36 also includes a centrally-located aperture 43 which is constructed and arranged to function as a drain hole for allowing any liquid or moisture which enters or accumulates in cargo strap module 22 from the top or sides to drain out. It is also possible for moisture to enter the inside of the housing 22a by way of the cargo strap as is retracts or recoils back onto reel 25.

Figure 10A:
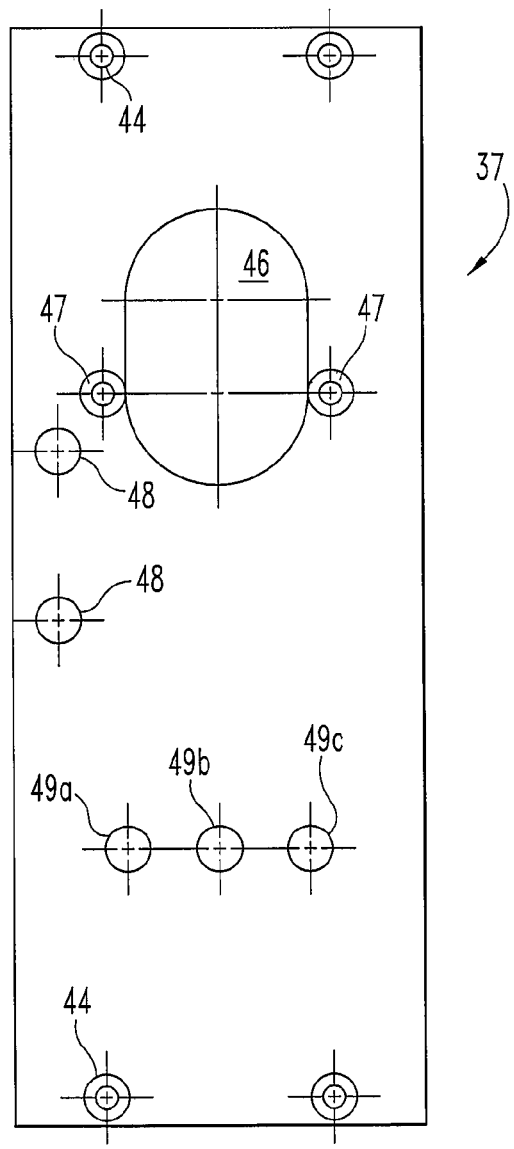
FIG. 10A is a front elevational view of a front wall comprising one portion of the FIG. 6 cargo strap module.
Figure 10B:
FIG. 10B is a bottom plan view of the FIG. 10A front wall.
Figure 11A:
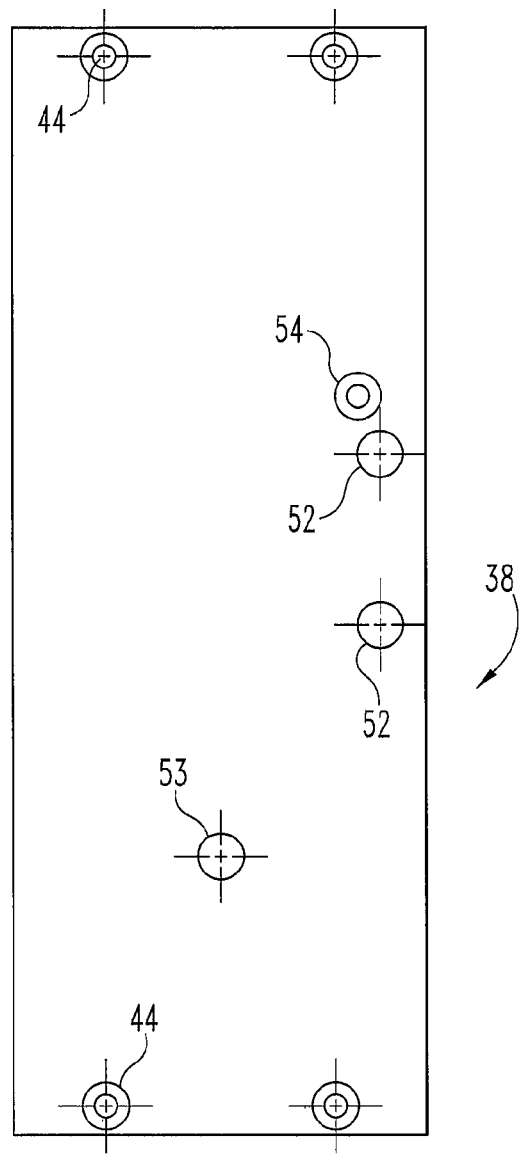
FIG. 11A is a front elevational view of a rear wall comprising one portion of the FIG. 6 cargo strap module.
Figure 11B:
FIG. 11B is a bottom plan view of the FIG. 11A rear wall.
Figure 12A:
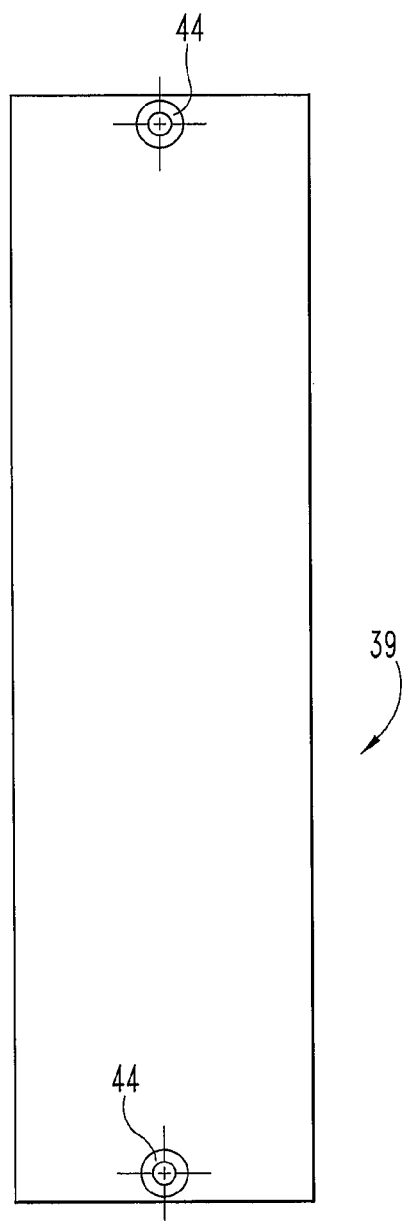
FIG. 12A is a front elevational view of a sidewall comprising one portion of the FIG. 6 cargo strap module.
Figure 12B:
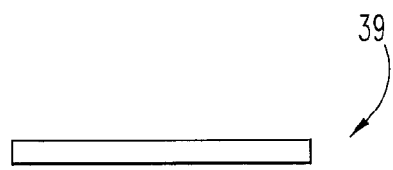
FIG. 12B is a bottom plan view of the FIG. 12A sidewall.

Referring now to FIGS. 10A and 10B, the front wall 37 includes a pair of countersunk clearance holes 44 adjacent its upper edge and another pair of countersunk clearance holes 44 adjacent its lower edge. The rear wall 38 (see FIGS. 11A and 11B) has a corresponding pattern of countersunk clearance holes 44. The two sidewalls 39 (see FIGS. 12A and 12B) each have a single countersunk clearance hole 44 adjacent its upper edge and another countersunk clearance hole 44 adjacent its lower edge. As should be clear and as would be understood, the number, location, and size of clearance holes 44 correspond to the number, location, and size of the internally-threaded holes 41 and 42 for receipt of countersunk (flat head) screws 45. In the selected embodiment, Allen flat head screws 45 are used and the size and shape characteristics of holes 41 and 42 and of holes 44 correspond and are compatible for proper assembly. The illustrations of FIGS. 1, 5, 6 and 7 show how the four walls 37 through 39 are assembled to the top and bottom plates, 35 and 36.

With continued reference to FIGS. 10A, 10B, 11A, and 11B, front wall 37 defines an oval aperture 46, a pair of countersunk clearance holes 47, two clearance holes 48 in one grouping, and three clearance holes 49a-49c in another grouping. Rear wall 38 defines a pair of clearance holes 52 which are axially aligned with clearance holes 48 defined by the front wall 37. Rear wall 38 also defines a single clearance hole 53 which is axially aligned with the center clearance hole 49b of that three-hole grouping defined by the front wall 37. The final clearance hole 54 is countersunk.

Figure 13A:
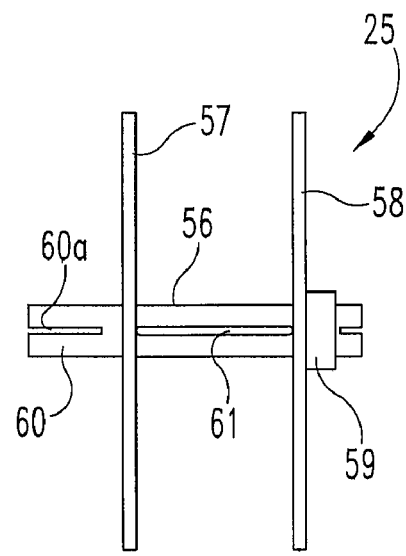
FIG. 13A is a side elevational view of a cargo strap reel which comprises one portion of the FIG. 6 cargo strap module.
Figure 13B:
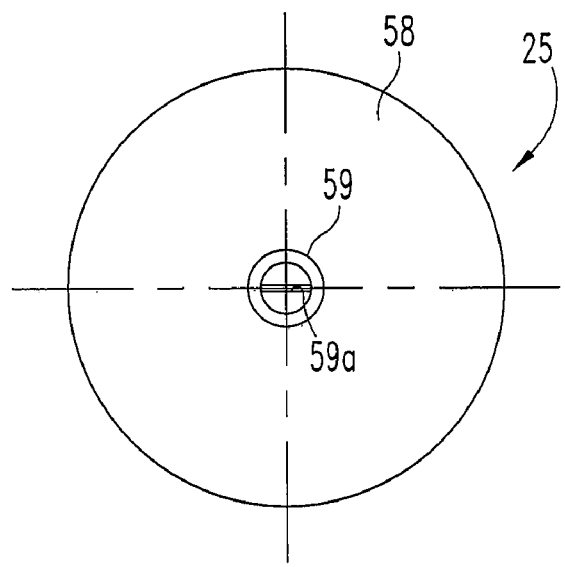
FIG. 13B is a front elevational view of the FIG. 13A cargo strap reel.

Referring now to FIGS. 13A and 13B, the cargo strap reel 25 is illustrated in greater detail. Reel 25 is constructed and arranged to receive a length of cargo strap 26 in a wound up arrangement and functions to dispense a portion of that cargo strap length as the cargo strap unwinds off of or from reel 25. The cargo strap reel 25 includes generally cylindrical axle 56, first circular plate 57, and second circular plate 58. These two circular plates are substantially parallel to each other, axially aligned with each other and spaced apart so as to cooperatively function to control the wind up and unwinding of the cargo strap 26 onto axle 56. Axle 56 has a shouldered pivot 59 at one end, a cylindrical pivot 60 at the opposite end, and a cargo strap slot 61. The cargo strap slot 61 is constructed and arranged to receive and fixedly secure one end of the cargo strap 26 to or around axle 56. Shouldered pivot 59 is received by clearance hole 53 in rear wall 38 with what would be a near line-to-line fit, though with a slight clearance, to allow shouldered pivot 59 to freely turn within clearance hole 53. The end of shoulder pivot 59 is optionally slotted at 59a as a convenient way of manually turning reel 25 when it is desired or necessary to wind up a length of cargo strap 26 onto reel 25. The cylindrical pivot 60 is received by clearance hole 49b in front wall 37. In a similar manner, the sizing between cylindrical pivot 60 and clearance hole 49b is such that the fit is near line-to-line, though with slight clearance such that cylindrical pivot 60 will freely rotate within clearance hole 49b. Considering the straight cylindrical form of axle 56, it is important for the longitudinal axis of axle 56 to generally coincide with the axial centers of clearance holes 53 and 49b.

Figure 14A:
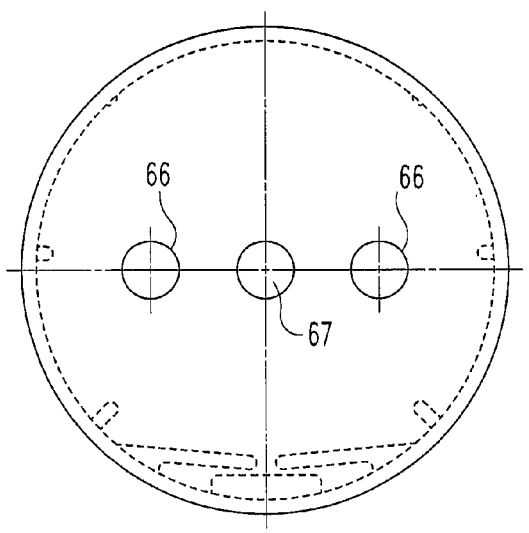
FIG. 14A is a front elevational view of a spring housing which comprises one portion of the FIG. 6 cargo strap module.
Figure 14B:
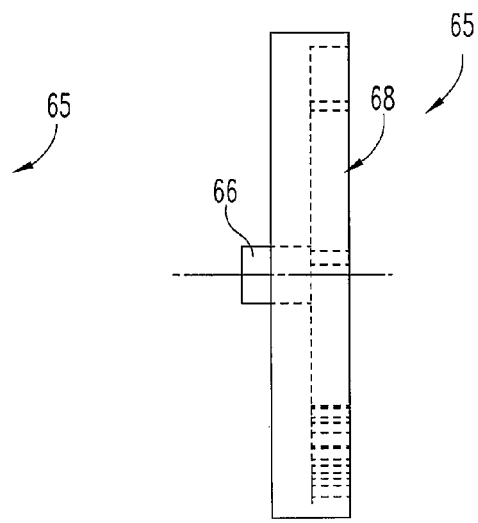
FIG. 14B is a side elevational view of the FIG. 14A spring housing.
Figure 14C:
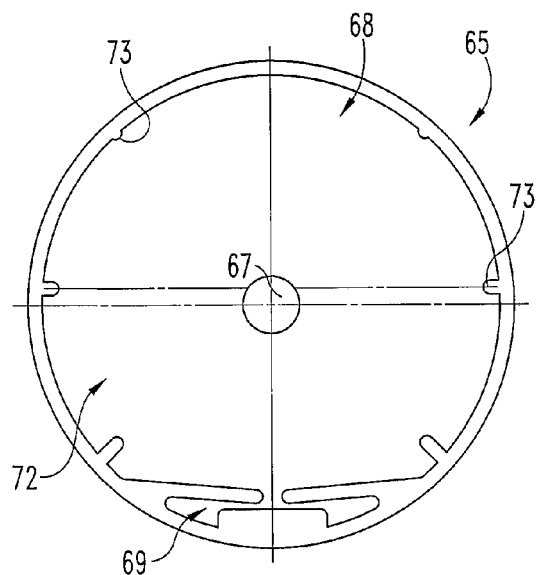
FIG. 14C is a rear elevational view of the FIG. 14A spring housing.
Figure 14D:
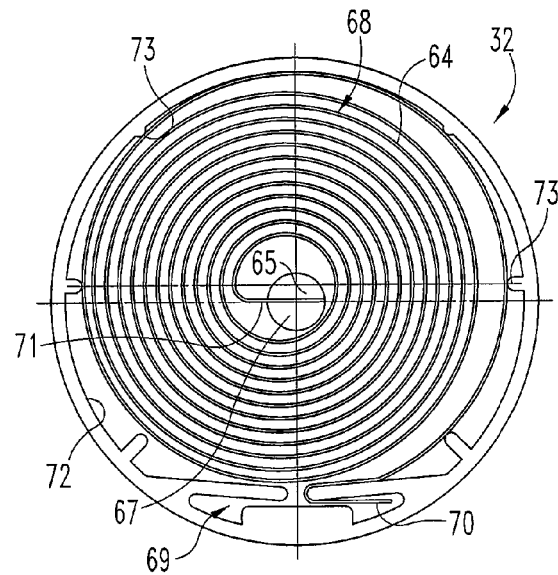
FIG. 14D is a rear elevational view of a spring module which comprises one portion of the FIG. 6 cargo strap module and which includes the FIG. 14A spring housing.

Pivot 60 is slotted at 60a and slot 60a receives an end of coil spring 64 (see FIG. 14D). Spring 64 is coiled up and loaded into spring housing 65 to complete the spring module 32. The slot 60a is deep enough to receive the width of spring 64 and enable the free end of pivot 60 to be inserted into clearance hole 49b.

Referring now to FIGS. 14A-14D, the spring housing 65 (FIGS. 14A-14C) and the spring module 32 (FIG. 14D) are illustrated. Spring housing 65 is a generally cylindrical component with a spaced pair of aligned posts 66 and an axially-centered clearance hole 67. Pivot 60 extends through clearance hole 67 and is then received by clearance hole 49b. The two posts 66 are received by clearance holes 49a and 49c.

The inner-facing side of housing 65 is machined with a recessed spring pocket 68 for receipt of coil spring 64. A retention slot 69 is shaped so as to securely receive and fixedly clamp a first end 70 of spring 64. The opposite end 71 of spring 64 is bent, aligned with clearance hole 67, and ultimately received within slot 60a. The inner surface 72 of pocket 68 is formed (or machined) with guide projections 73 which extend in a generally radially inward direction. These projections 73 abut the outer layer or winding of coil spring 64 so as to help reduce or limit the degree of frictional interference or drag as the spring 64 coils and uncoils as the cargo strap 26 is extended off of reel 25 and then recoiled or retracted by the action of spring 64. As reel 25 turns as a portion of the cargo strap length is extended (unwound or dispensed), the rotation of axle 56 coils spring 64 into a tighter wind and builds up the stored energy in the spring. When the clamping force on the cargo strap is relieved, the spring force reverses the rotation direction of reel 25 from unwinding to winding and the extended portion of the cargo strap length is wound back up on reel 25.

Referring now to FIGS. 15A and 15B, one of the two guide rollers 27 and 28 is illustrated in detail. The construction of each guide roller 27 and 28 is the same and thus only one guide roller 27 is illustrated in FIGS. 15A and 15B as representative of the construction of each. Guide roller 27 includes a first cylindrical end 77 which fits into the lower clearance hole 48. The opposite cylindrical end 78 fits into the lower clearance hole 52. The other guide roller 28 is similarly assembled with its first cylindrical end inserted into the other (upper) clearance hole 48 and its second, opposite end inserted into the other (upper) clearance hole 52.

The cylindrical shoulders 79 and 80 define a generally cylindrical center section 81 which is constructed and arranged to receive a portion of the length of cargo strap 26 as the cargo strap 26 travels flat over section 81. Shoulders 79 and 80 also help establish the correct position for each guide roller 27 and 28 between the front wall 37 and the rear wall 38. Section 81 has an axial length which is just slightly larger (wider) than the width of cargo strap 26 so as to help maintain alignment and the straight travel of the cargo strap between shoulders 79 and 80. As a portion of the length of cargo strap 26 which is wound on reel 25 unwinds from reel 25 as it is dispensed, it travels flat across the center section 81 of each guide roller 27 and 28, first over guide roller 27 and from there around the center section 81 of guide roller 28 toward guide member 29 (see FIGS. 16A-16D).

Figure 16B:
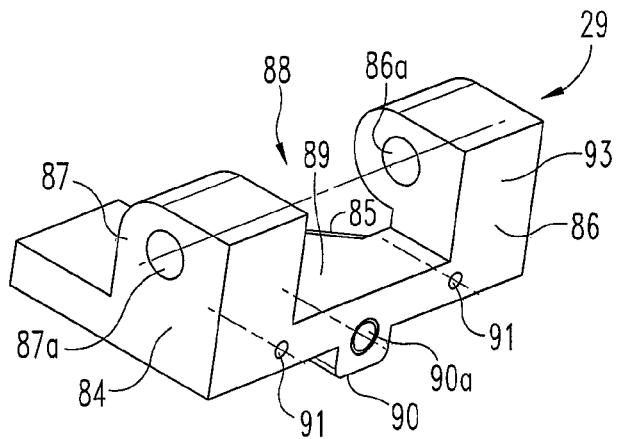
FIG. 16B is a perspective view of a guide member which comprises one portion of the FIG. 6 cargo strap module and includes the FIG. 16A guide block.
Figure 16C:
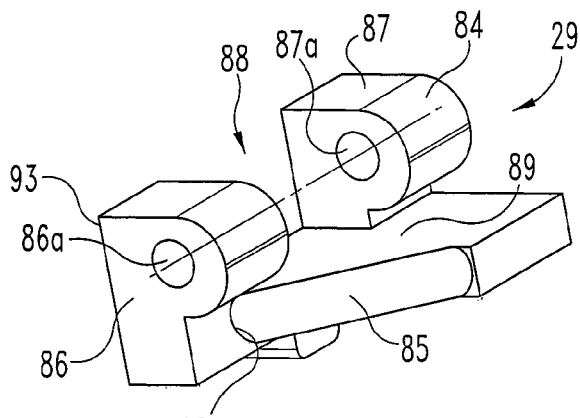
FIG. 16C is a perspective view of the FIG. 16B guide member.
Figure 16D:
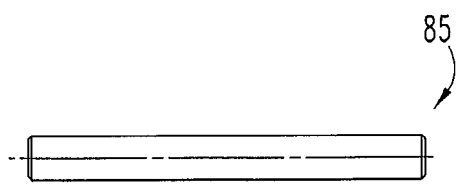
FIG. 16D is a front elevational view of a roller pin comprising one portion of the FIG. 16B guide member.

Referring now to FIGS. 16A-16D, the guide member 29 is illustrated in greater detail in FIGS. 16B and 16C. Guide member 29 includes a guide block 84 (FIG. 16A) and a roller pin 85 (FIG. 16D) which is assembled into guide block 84 at an approximately 45 degree angle between the planar surface or geometric planes defined by the front wall 37 and the forward-facing sidewall 39. A portion of the length of cargo strap which is dispensed from reel 25 leaves guide roller 28 and, as it passes over the surface of roller pin 85, the 45 degree angle of roller pin 85 changes the direction of travel of the cargo strap portion.

In terms of orientations and directions, it is important to understand that for use the cargo strap 26 is to be extended in a direction which is generally perpendicular to the geometric plane defined by front wall 37. Since the width of the space within the stake pocket 21 is limited, consideration has to be given to how reel 25 is oriented within the stake pocket. As the length of cargo strap 26 to be loaded onto reel 25 increases, the wound up diameter increases. If the reel 25 would be turned such that axle 56 extends in the forward direction of vehicle travel, then the diameter size of the wound up length of cargo strap 26 could easily exceed the available width space within stake pocket 21. In part, this is why the axis of the axle 56 is oriented so as to be generally perpendicular to the geometric plane defined by front wall 37. In this way, the only practical size limitation which is dictated by the width of the stake pocket 21 is the width of the cargo strap 26, but not the length of cargo strap which is wound up on reel 25 (at least not within the practical limits based on the amount of cargo strap which might be needed for securing cargo).

With the reel 25 oriented as described and as disclosed herein, the portion of the length of cargo strap 26 which is dispensed from reel 25 initially travels in a first direction which line of travel is in a geometric plane which is substantially perpendicular to the long axis of axle 56. When this portion of the length of cargo strap 26 travels across roller pin 85 which is set at the 45 degree angle, the direction of travel changes by approximately 90 degrees to a second direction of travel for the cargo strap portion is generally perpendicular to the first direction of travel. This second direction of travel is in a geometric plane which is substantially parallel with the longitudinal axis of axle 56 and is generally perpendicular to the geometric plane of front wall 37.

With continued reference to FIGS. 16A-16D, guide block 84 includes a clevis-type configuration with support bosses 86 and 87 with a defined clearance space 88 therebetween. Lower shelf 89 includes a block 90 and block 90 defines a tapped hole 90a. Each boss 86 and 87 defines a support pin hole 86a and 87a, respectively. The axial centerlines of holes 86a and 87a are coincident and these holes receive an end of a support pin which is used to support clamp member 30 between bosses 86 and 87. Tapped holes 91 in the face of lower shelf 89 are used to receive flat head screws to securely attach guide block 84 to the inside surface of front wall 37. Clearance holes 47 are aligned with tap holes 91 for receipt of the flat head screws. As will be further explained when describing the construction of cover 23, there is a countersunk clearance hole which is aligned with tapped hole 90a for securely attaching the cover 23 to the guide block 84. In the process, the sidewall of the vehicle stake pocket 21 is clamped between cover 23 and the inwardly facing, planar surface of front wall 37, (see FIG. 5).

In one embodiment of guide block 84, a blind hole 92 is machined into a portion of lower shelf 89 at the referenced 45 degree angle relative to surface 93 which is the surface that abuts up against the inner surface of front wall 37. The diameter size of the blind hole 92 establishes a line-to-line fit with one end of roller pin 85 (see FIG. 16D). The roller pin 85 is pressed into blind hole 92 and thereby creates the 45 degree travel surface for changing the direction of travel of the cargo strap by approximately 90 degrees from the first dispensing direction as a portion of the length of cargo strap unwinds from the reel 25 to its extended-for-use direction as it exits from housing 22a and through a slot in cover 23. In an alternate embodiment of guide block 84, in lieu of a blind hole 92, a through hole can be machined completely through from one portion of guide block 84 to an opposite portion such that both ends of roller pin 85 are secured. Either embodiment is acceptable since the function of roller pin 85 is to provide a suitable surface for the flat travel of cargo strap 26 and a surface which is set at a 45 degree angle for changing the direction of travel by approximately ninety (90) degrees.

Figure 17A:
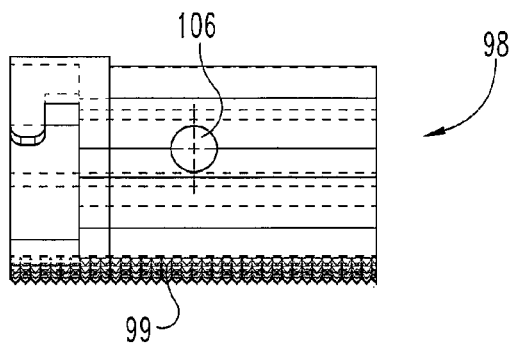
FIG. 17A is a front elevational view of a clamp block comprising one portion of the FIG. 6 cargo strap module.
Figure 17B:
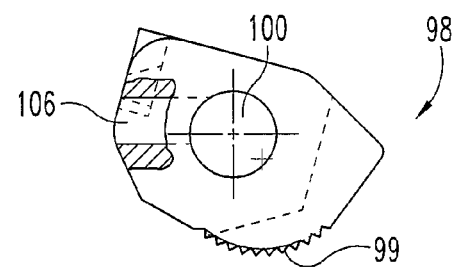
FIG. 17B is a side elevational view, in partial section, of the FIG. 17A clamp block.
Figure 17C:
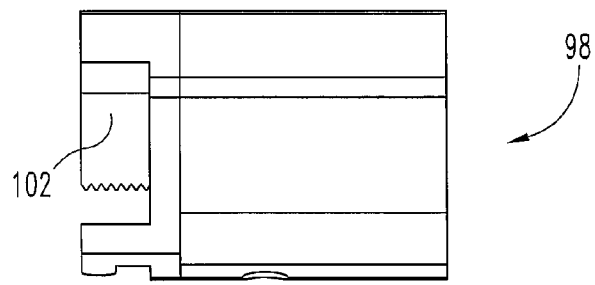
FIG. 17C is a top plan view of the FIG. 17A clamp block.

Referring now to FIGS. 17A-17C, the details of clamp block 98 are illustrated. Clamp member 30 includes block 98 in combination with lever 31 and coil spring 103 (see FIG. 6). Block 98 has a knurled surface 99 which is an eccentric relative to the pivot axis defined by through hole 100. Hole 100 is axially coincident with the axial centerlines of holes 86a and 87a. A generally cylindrical pivot pin 101, similar in construction to pin 85 only with a different length and optionally with a different diameter, is inserted through holes 86a, 87a, and 100 so as to secure the block 98 into the clearance space 88 of guide block 84. Further, this construction using pivot pin 101 allows clamp member 30 to rotate or pivot relative to guide block 84.

A corner portion 102 of block 98 is removed in order to create a clearance space for coil spring 103. Coil spring 103 is anchored at one end to block 98 and at an opposite end to guide block 84 so as to place block 98 in a normally spring-biased condition against the upper surface of lower shelf 89. A tang finger is moved against the bias of the spring with the rotation of clamp member 30 relative to guide member 29. Knurled surface 99 is constructed and arranged to be spring-biased into contact with the upper surface of lower shelf 89. As the dispensed portion of the length of cargo strap 26 travels over roller pin 85 on its exit path out of cargo strap module 22, the cargo strap portion passes between the knurled surface 99 and the lower shelf 89. The spring-biased construction means that in the normal or at rest condition, the cargo strap is clamped and is not otherwise movable to either extend or rewind onto reel 25.

Lever bore 106 is machined into block 98 and receives, with a press fit, lever 31. Pulling down on lever 31 releases the clamped engagement of the knurled surface 99 against the cargo strap portion which is secured below knurled surface 99. With the lever 31 pulled down, the cargo strap is able to be either extended outwardly from module 22 or rewound onto reel 25. In use, the lever 31 is used to release the clamped condition and permits a portion of the cargo strap to be unwound from reel 25. Once a desired amount of cargo strap is released, the cargo securement proceeds. When the cargo is to be released by releasing the cargo strap from its secured condition, the first step is to unhook the cargo strap or unwrap it from the cargo and, with cargo strap in hand, release lever 31, thereby allowing the recoil force on spring 64 to rotate reel 25 in a wind up direction, thereby rewinding or recoiling the cargo strap by pulling it back through cover 23 into cargo strap module 22. As reel 25 rotates due to the recoiling spring force, reel 25 winds up the dispensed cargo strap portion. When the free end of the cargo strap which extends through cover 23 approaches cover 23 during the rewind, the lever 31 is released and the knurled surface 99 reestablishes a clamped condition on that portion of the cargo strap which is located between knurled surface 99 and lower shelf 89. Due to the eccentric shape and location of knurled surface 99 relative to the pivot axis of block 98, pulling outwardly on the cargo strap portion which extends out from cover 23 actually increases the clamping force on the cargo strap. In this way, once the cargo is secured, pulling on the cargo strap, whether by load shifting or for other reasons, there will not be any further loosening or extension of the cargo strap.

Although a lever is shown as the clamp release mechanism, it is assumed that a slide switch or similar thumb switch or thumb slide will be mounted onto lever 31 and this alternate construction is shown in FIG. 4. Using this type of slide switch allows the lever to still perform in its normal manner but with a more streamline and compact shape and without having any lever extension beyond cover 23. Structurally, some type of lever or switch is needed in order to be able to pivot or turn block 98 relative to guide block 84.

Figure 18A:
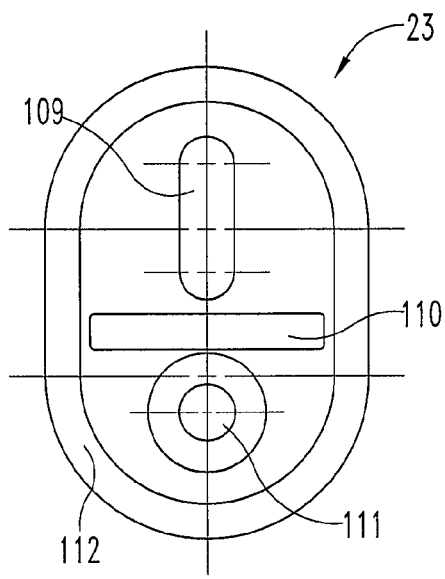
FIG. 18A is a front elevational view of a cover which comprises one portion of the FIG. 6 cargo strap module.
Figure 18B:
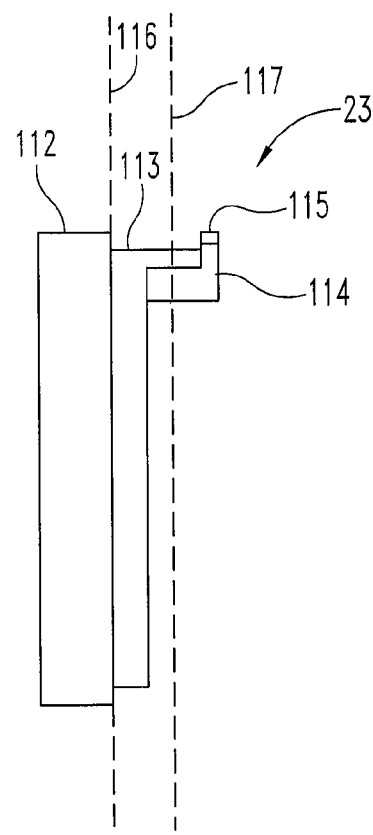
FIG. 18B is a side elevational view of the FIG. 18A cover showing the relative position of a vehicle stake pocket sidewall.

Referring now to FIGS. 18A-18B, the details of cover 23 are illustrated. Cover 23 defines an oblong slot 109, a cargo strap slot 110, and a countersunk clearance hole 111. Oblong slot 109 has a generally vertical orientation and is used for lever 31, allowing downward movement of lever 31 within slot 109. Slot 110 has a generally horizontal orientation and has a width and height sufficient for a portion of the length of cargo strap 26 to extend therethrough as the cargo strap is pulled out and unwound off of reel 25. The countersunk clearance hole 111 is used for fastener 24 which threadedly engages tapped hole 90a.

Cover 23 includes a larger oval frame 112 and a smaller oval step 113. Extension 114 extends into oval aperture 46 and lip 115 hooks on to the upper edge of aperture 46. Broken lines 116 and 117 generally define the locations of the inner and outer surfaces, respectively, of the interior-facing wall 21a (i.e., the stake pocket wall) which is clamped between cover 23 and front wall 37. As illustrated in FIG. 18B, the frame 112 is up against inner surface 116 for the referenced clamping. The cooperating opening in the vehicle sidewall generally corresponds to the size and shape of oval step 113 such that oval step 113 will extend through the vehicle sidewall opening while still enabling the clamped assembly as noted.

Since the pulling force or load on the cargo strap portion which has been dispensed off of the reel 25 is substantially perpendicular to the surface of front wall 37, the sidewall of the vehicle provides an abutment. Further, the eccentric configuration of the knurled surface 99 causes any such pulling force on the cargo strap to actually increase the clamping force on the cargo strap portion positioned between the knurled surface 99 and the lower shelf 89. Even though only a single screw 24 secures the cargo strap module 22 inside the stake pocket 21, the only load actually on this single screw is from the weight of the cargo strap module 22. If the pulling force was in an upward direction, tending to pull the cargo strap module out of the stake pocket, then the pulling force load would be on the screw, as the force tries to pull the cargo strap module 22 out of the stake pocket. This is one reason why the interior side exit for the cargo strap portion being dispensed is an advantage. Another benefit of this side exit location is being able to extend the cargo strap portion in a more direct and efficient manner since the free end is already within the bed of the vehicle, precisely where the cargo will be located. This side exit for the cargo strap also provides a location which is generally felt to be similar in height to where the center of gravity will be for most cargo.

The free end of the cargo strap is illustrated with a loop, but it is to be understood that a clip, hook, or similar anchor component can be used with or in lieu of the cargo strap loop. A further optional feature is to add a blind tapped hole 120 into top plate 35 (shown only in FIG. 1). This blind tapped hole would be used for a threaded rod or a small eyebolt (see FIG. 5) to which a hook or cable could be connected as an added convenience when lowering the cargo strap module 22 down into the stake pocket. By having this type of connection, the user or installer can more easily lower the module so as to line up the vehicle sidewall opening and cover 23 with the tapped hole 90a for the threaded installation using screw 24. Once screw 24 is tightened, whatever accessory might have been used with the blind tapped hole can be removed. In this way, and as described, and as would be clear from an understanding of the disclosed cargo strap assembly 20, there is no alteration nor any modification of any type made to the vehicle. The cargo strap assembly 20 can be easily installed and removed (using a special tool as one option) and the vehicle is always able to be restored to its starting condition. Screw 24 is illustrated with an Allen head configuration since it is unlikely that a would-be thief would have the correct hand tool for removal. Another option for the head design is to use a TORX® style as having the correct tool for removal would be less likely. A still further option is to use a unique head design and supply a special removal tool with the product.

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:

1. A cargo strap assembly constructed and arranged for receipt by a stake pocket of a vehicle, said stake pocket defined in part by an interior-facing wall which defines an opening, said cargo strap assembly comprising:
   a cargo strap module which is constructed and arranged to fit within said stake pocket, said cargo strap module including a guide member and a retractable cargo strap, said retractable cargo strap having an extendable portion, said extendable portion being received by said guide member which is constructed and arranged to turn said extendable portion from a first direction to a second direction so as to extend through said opening; and
   a cover constructed and arranged to be positioned against said interior-facing wall and attached to said cargo strap module.

2. The cargo strap assembly of claim 1 wherein said cargo strap module includes a cargo strap dispenser, said cargo strap dispenser being constructed and arranged to receive a portion of said cargo strap.

3. The cargo strap assembly of claim 2 wherein said cargo strap dispenser includes retracting means for returning an extended portion of said cargo strap to said cargo strap dispenser.

4. The cargo strap assembly of claim 3 wherein said dispenser is a cargo strap reel which is constructed and arranged to receive a wound length of said cargo strap.

5. The cargo strap assembly of claim 4 wherein said retracting means includes a recoil spring which is constructed and arranged to automatically retract said extended portion of said cargo strap.

6. The cargo strap assembly of claim 1 wherein said first direction is substantially perpendicular to said second direction.

7. The cargo strap assembly of claim 6 wherein said second direction extends through said opening.

8. The cargo strap assembly of claim 7 wherein said second direction extends through an aperture defined by said cover.

9. The cargo strap assembly of claim 1 wherein said second direction of travel extends through said sidewall opening.

10. The cargo strap assembly of claim 1 wherein said cargo strap module includes a spring-biased clamp which is constructed and arranged for clamping against an extended portion of said cargo strap so as to prevent further travel of said cargo strap, until said spring-biased clamp is released.

11. The cargo strap assembly of claim 10 wherein said cargo strap module includes manually-operable control means for releasing said spring-biased clamp from a clamping position against said extended portion of said cargo strap.

12. The cargo strap assembly of claim 11 wherein said second direction extends through said opening.

13. The cargo strap assembly of claim 12 wherein said cargo strap module includes a cargo strap dispenser, said cargo strap dispenser being constructed and arranged to receive said cargo strap.

14. The cargo strap assembly of claim 13 wherein said cargo strap dispenser includes retracting means for returning an extended portion of said cargo strap to said cargo strap dispenser.

15. The cargo strap assembly of claim 1 wherein said cover is constructed and arranged with a shoulder for clamping said interior-facing wall between said shoulder and said cargo strap module.

16. In combination:
  a vehicle having a stake pocket defined in part by an interior-facing wall, said interior-facing wall defining an opening which is in communication with said stake pocket; and
  a cargo strap assembly constructed and arranged for receipt by said stake pocket, said cargo strap assembly comprising:
    a cargo strap module which is constructed and arranged to fit within said stake pocket, said cargo strap module including a retractable cargo strap, said retractable cargo strap having an extendable portion, said extendable portion being constructed and arranged to extend through said opening; and
    a cover constructed and arranged with a first portion to be positioned against said interior-facing wall, said cover having mounting means for attaching said cover to said cargo strap module, whereby said interior-facing wall is clamped between said first portion and said cargo strap module.

17. A cargo strap assembly constructed and arranged for receipt by a stake pocket of a vehicle, said stake pocket defined in part by an interior-facing wall which defines an opening in communication with said stake pocket, said cargo strap assembly comprising:
  a cargo strap module which is constructed and arranged to fit within said stake pocket, said cargo strap module including a retractable cargo strap, said retractable cargo strap having an extendable portion, said extendable portion being constructed and arranged to extend through said opening;
  a cover constructed and arranged to be positioned against said interior-facing wall, said cover having mounting means for attaching said cover to said cargo strap module, whereby said cargo strap module is secured within said stake pocket;
  wherein said cargo strap module includes guide means for receiving an extended portion of said cargo strap, said extended portion having a first direction of travel, and for changing said first direction of travel to a second direction of travel; and
  wherein said first direction of travel is substantially perpendicular to said second direction of travel.

18. The cargo strap assembly of claim 17 wherein said second direction of travel extends through said opening.

19. The cargo strap assembly of claim 18 wherein said second direction of travel extends through an aperture defined by said cover.

20. In combination:
  a vehicle having a stake pocket defined in part by an interior-facing wall, said interior-facing wall defining an opening which is in communication with said stake pocket; and
  a cargo strap assembly constructed and arranged for receipt by said stake pocket, said cargo strap assembly comprising:
    a cargo strap module which is constructed and arranged to fit within said stake pocket, said cargo strap module including a retractable cargo strap, said retractable cargo strap having an extendable portion, said extendable portion being constructed and arranged to extend through said opening; and
    a cover constructed and arranged for attachment to said cargo strap module with a first portion to be positioned against said interior-facing wall, and a second portion extending through said interior-facing wall, said second portion defining a cargo strap slot.

* * * * *